United States Patent [19]

Watabe

[11] Patent Number: 4,682,279
[45] Date of Patent: Jul. 21, 1987

[54] OPERATION MODE CONTROLLER

[75] Inventor: Shin Watabe, Nishibiwajima, Japan

[73] Assignee: Mitsubishi Jukogyo Kabushiki Kaisha, Tokyo, Japan

[21] Appl. No.: 937,451

[22] Filed: Dec. 1, 1986

Related U.S. Application Data

[63] Continuation of Ser. No. 616,244, Jun. 1, 1984, abandoned.

[30] Foreign Application Priority Data

Jun. 7, 1983 [JP] Japan ................................ 58-101438

[51] Int. Cl.⁴ ...................... G05B 11/01; F25B 29/00
[52] U.S. Cl. .................................... 364/141; 364/557; 364/160; 364/180; 165/12; 165/26; 236/46 R; 307/39
[58] Field of Search ............... 364/141, 143, 160, 180, 364/557; 165/12, 26, 27; 307/39; 236/15 BG, 46 R, 46 F

[56] References Cited

U.S. PATENT DOCUMENTS

| | | | |
|---|---|---|---|
| 4,200,910 | 4/1980 | Hall | 364/557 |
| 4,253,153 | 2/1981 | Bitterli et al. | 165/26 |
| 4,308,911 | 1/1982 | Mandl | 165/26 |
| 4,316,256 | 2/1982 | Hendricks et al. | 364/557 |
| 4,323,112 | 4/1982 | Nordeen | 165/27 |
| 4,325,427 | 4/1982 | Bramow et al. | 165/27 |
| 4,386,649 | 6/1983 | Hines et al. | 364/557 |
| 4,390,959 | 6/1983 | Cabou | 364/557 |
| 4,419,866 | 12/1983 | Howland | 165/26 |
| 4,446,913 | 5/1984 | Krocher | 364/557 |
| 4,475,685 | 10/1984 | Grimado et al. | 364/557 |

Primary Examiner—Joseph Ruggiero
Assistant Examiner—John R. Lastova
Attorney, Agent, or Firm—Birch, Stewart, Kolasch & Birch

[57] ABSTRACT

In an operation mode controller wherein a sensor for sensing a quantity of a variable to be controlled is provided and a plurality of operation modes are changed from one to another in accordance with the sensed quantity to set any desired mode, the controller includes; a memory for setting and storing change conditions of the plural operation modes; apparatus preset for determining a set of threshold values for each of the plurality of operation modes, selecting apparatus for choosing the set of threshold values corresponding to a preset operation mode; an switching device for changing the operation modes in accordance with the change conditions when the sensed quantity of the variable that is to be controlled exceeds the chosen set of threshold values corresponding to the preset operation mode.

8 Claims, 8 Drawing Figures

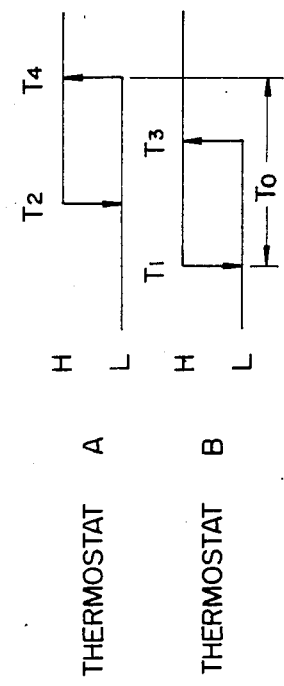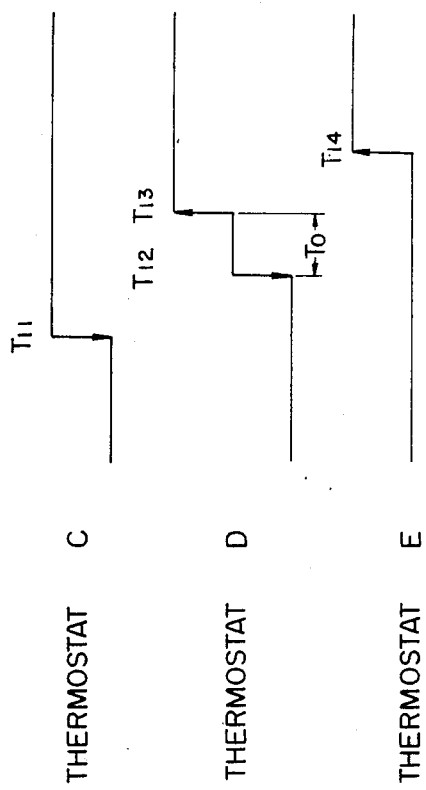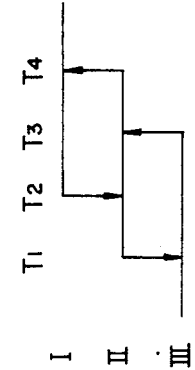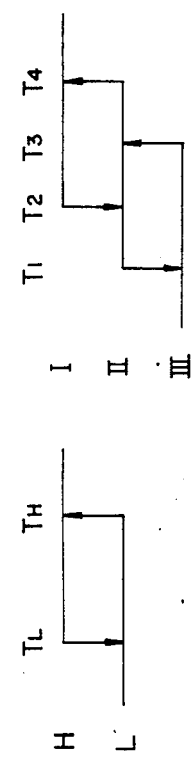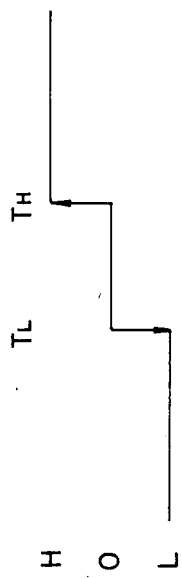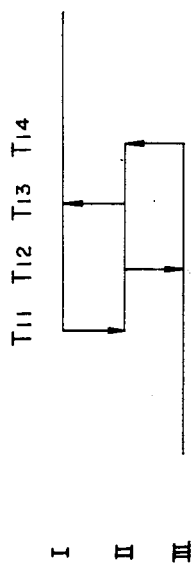

OPERATION MODE CONTROLLER

This application is a continuation of application Ser. No. 616,244 filed on June 1, 1984 and now abandoned.

BACKGROUND OF THE INVENTION

This invention relates to an operation mode controller which is utilized in controlling a temperature level in a refrigerating room by use of a refrigerator or the like equipped with, e.g., a thermostat.

FIG. 1 shows a basic function of a thermostat incorporated in a conventional temperature control apparatus such as a refrigerator or the like used for, e.g., marine transportation.

The thermostat outputs an "H" level when a measured temperature exceeds $T_H$ during a rise in temperature, and an "L" level when the temperature is lowered less than $T_L$. When the indoor temperature of the refrigerating room rises and exceeds $T_H$, an output level of the thermostat becomes "H" to start refrigerating operation. On the other hand, when the indoor temperature is lowered to $T_L$, the thermostat output becomes an "L" level to stop the refrigerating operation.

FIG. 2 illustrates the operation of two thermostats connected in series.

An output level of the paired thermostats can assume three output levels "I", "II" and "III". More specifically, when the temperature sensed by the thermostats falls below $T_2$ from the state where the sensed temperature was high and an output level was "I", the output level becomes "II". When the sensed temperature is further lowered, below $T_1$, the output level now becomes "III". On the other hand, when the indoor temperature rises while in the state of output level "II" and the sensed temperature exceeds $T_4$, the output level returns to "I". Similarly, when the indoor temperature rises while in the state of output level "III" and the sensed temperature exceeds $T_3$, the output level returns to "II".

FIG. 3 shows operations of the individual thermostats A and B as the complex thermostat of FIG. 2.

The complex thermostat of FIG. 2 produces three output levels: "I" when both thermostats A and B are at an "H" level, the output level "II" when the thermostat A is at "L" and the thermostat B is at "H"; and the output level "III" when both thermostat A and B are at the output level "L".

When the temperature control apparatus incorporating such a complex thermostat is of, e.g., a heating-cooling system, the output level "I" of the thermostat corresponds to the state of cooling operation, the output level "II" corresponds to the state of operation shutdown, and the output level "III" corresponds to the state of heating operation.

In this case, now assuming that the difference between the temperature near an air blow-off port and temperature $T_2$ in the heating-cooling system is $T_C$ at the beginning of cooling operation and the difference between the temperature near the air blow-off port and temperature $T_3$ is $T_H$ at the beginning of heating operation Δ, $T_1$ of the thermostat B in FIG. 3 and $T_4$ of the thermostat A must be preset so that the difference between $T_2$ and $T_4$ is larger than $\Delta T_C$ and the difference between $T_1$ and $T_3$ is larger than $\Delta T_H$, respectively, to prevent the immediate return to the former level due to a large temperature difference at the beginning of cooling and heating operation. Further, $T_1$ must be preset lower than $T_2$ and $T_4$ must be set higher than $T_3$ in order to prevent direct switching of operation modes from heating to cooling or vice versa.

Control limit temperature $T_0$ of the air conditioner equipped with the foregoing complex thermostat is in a range from heating start temperature $T_1$ to cooling start temperature $T_4$. In this way, a width of the control temperature must be preset larger than temperature differences $\Delta T_C$ and $\Delta T_H$. This is very disadvantageous for high-accuracy temperature control.

The present invention resolves the problem as mentioned above. It is an object of the present invention to provide an operation mode controller which permits high-accuracy temperature control by restricting a control temperature width of the thermostat as small as possible and is applicable in controlling, e.g., the refrigerating state of a refrigerator used for marine transportation.

BRIEF DESCRIPTION OF THE DRAWINGS

Other features and advantages of the present invention will be apparent from the following description taken in connection with the accompanying drawings wherein:

FIG. 1 shows a basic function of a thermostat in a temperature controlled apparatus.

FIG. 2 shows a function of a complex thermostat including two thermostats connected in series.

FIG. 3 shows respective functions of two thermostats constituting the complex thermostat.

FIG. 5 shows a basic function of a complex thermostat incorporated in the operation mode controller.

FIG. 6 shows a function of the complex thermostat when the operation mode controller is applied to a heating-cooling system.

FIG. 7 shows functions of the individual thermostats of the complex thermostats when the operation mode controller is applied to the heating-cooling system.

DESCRIPTION OF THE PREFERRED EMBODIMENTS

Figure 4:
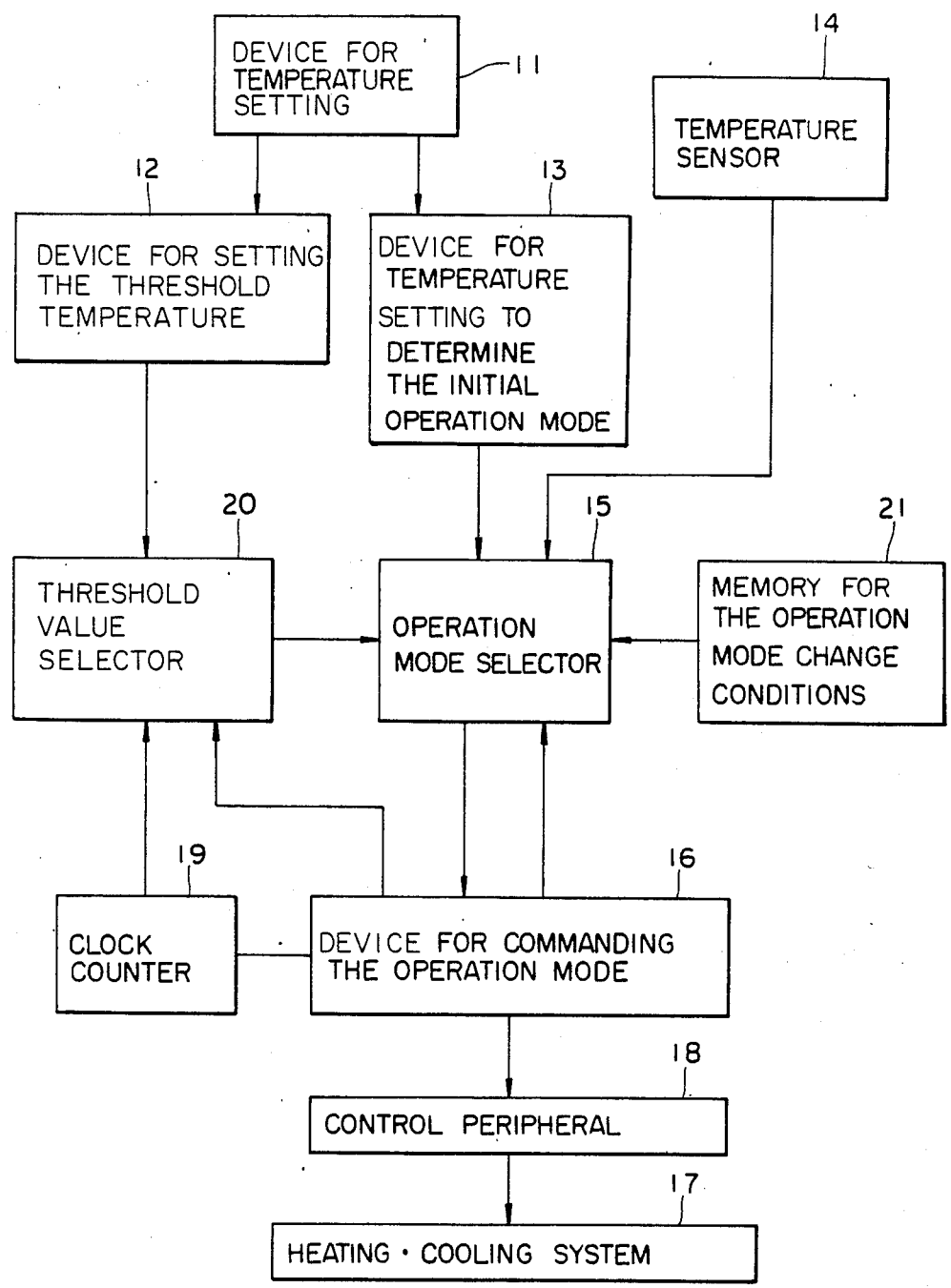
FIG. 4 shows a block diagram of an operation mode controller according to one embodiment of this invention.

Referring to the block diagram shown in FIG. 4, the functions of the operation mode controller according to this invention will be now described.

First, the control limit of temperature to be maintained is determined by means of the device for temperature setting 11. In accordance with this control limit threshold values for temperature control in a plurality of operation modes, such as a cooling operation, operation shutdown and a heating operation, are respectively preset by a device for setting the threshold temperature 12, and the temperature for deciding the initial operation mode is determined by the device for setting the temperature to determine the initial operation mode 13. By determining whether temperature T sensed by a temperature sensor 14 is higher or lower than the temperature determined by the device 13, the initial operation mode is selected by an operation mode selector 15.

An operation mode signal thus selected is sent to a control peripheral 18 of a heating-cooling system 17 through a device for commanding the operation mode 16, to start the operation under the selected operation mode. When the above operation mode is commanded to the control peripheral 18, a timer 19 starts clock counting simultaneously. After completion of counting of a certain time t by the timer 19, the threshold values for temperature control determined by the device for setting the threshold temperature value 12 are now set in the threshold value selector 20 in accordance with the operation mode sent from the device for commanding the operation mode 16.

The operation mode selector 15 compares the upper and lower threshold values registered in the threshold value selector 20 with the temperature T sensed by the temperature sensor 14. The operation mode selector 15 continues to select the current operation mode when the sensed temperature T is within the upper and lower threshold values of control, and it selects a new operation mode in accordance with operation mode change conditions stored in a memory for the operation mode change conditions, 21 when the sensed temperature T exceeds the threshold values of control.

The new operation mode thus selected is commanded again to the control peripheral 18 through the device for commanding the operation mode 16, so that the heating-cooling system 17 starts to operate under the new operation mode.

At the same time, the timer 19 starts the clock counting again. After counting for a certain time t, the control threshold values stored in the threshold value selector 20 in accordance with the previous operation mode are deleted and then new control threshold values in accordance with the new operation mode, are set in the device 20. The operation mode selector, 15 compares the control threshold values in accordance with the new operation mode to the temperature T sensed by the temperature sensor 14. A new operation mode is selected again in accordance with the operation mode change conditions stored in the memory for the operation mode change conditions 21.

FIG. 5 shows a basic function of a complex thermostat incorporated in the operation mode controller. $T_H$ and $T_L$ in FIG. 5 represent upper and lower temperature control limits set in the threshold value selector 20 in FIG. 4, respectively. In the operation mode selector 15, temperature T sensed by the temperature sensor 14 is compared with the temperature control limits $T_H$ and $T_L$. When the sensed temperature T is between $T_H$ and $T_L$, the output level of the thermostat remains unchanged to maintain the current operation mode; when the sensed temperature T exceeds $T_H$, the output level becomes "H" to select a new operation mode in a level upgraded by one degree in accordance with the operation mode change conditions stored in the memory 21; and when the sensed temperature T is falls below $T_L$, the output level becomes "L" to select a new operation mode in a level downgraded by one degree.

FIG. 6 shows a function of the complex thermostat in the embodiment where the operation mode controller of the present invention is applied to a heating-cooling system.

FIG. 7 shows respective functions of individual thermostats C, D and E used in the operation mode controller of FIG. 6.

Figure 8:
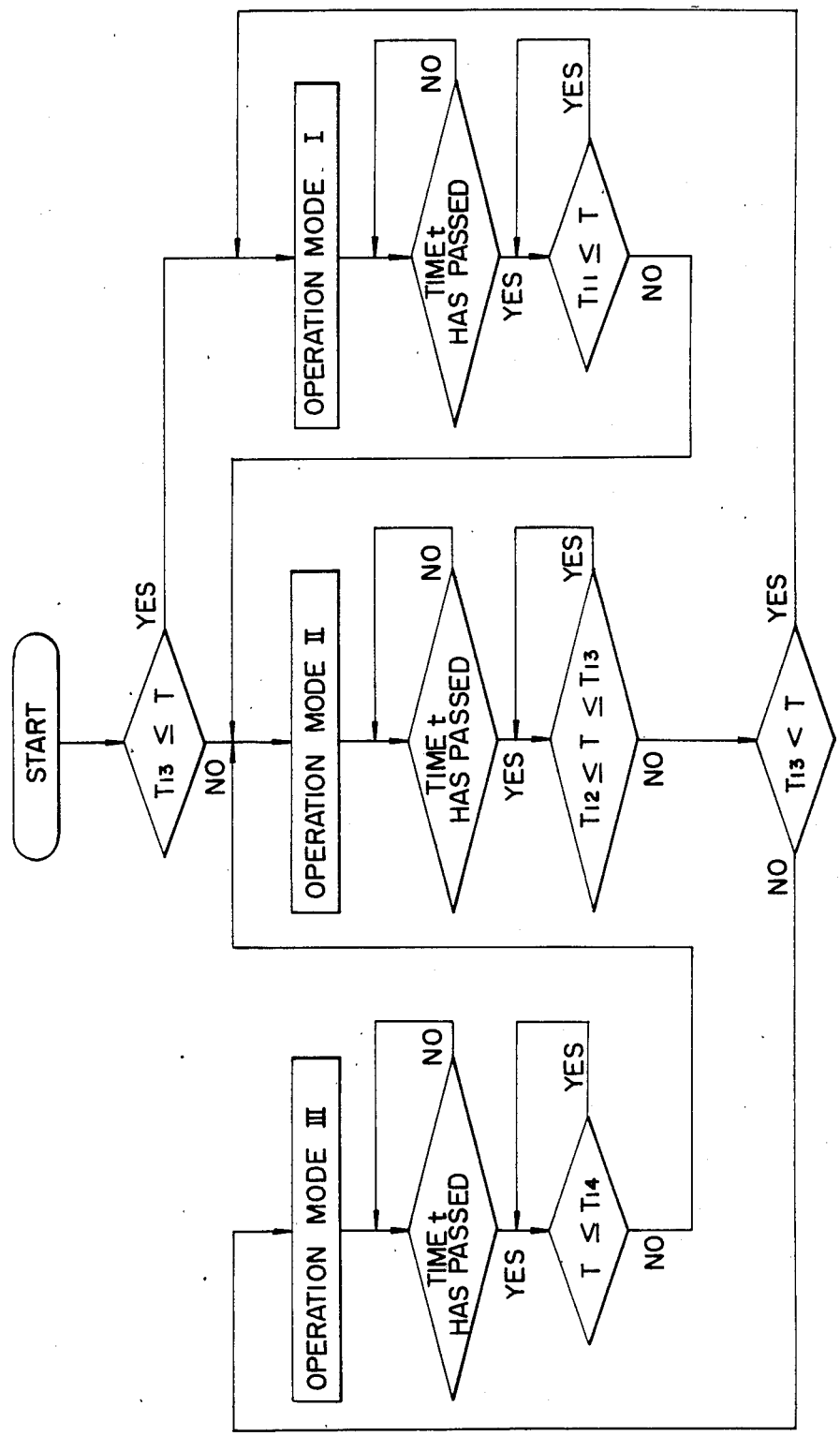
FIG. 8 shows a flow chart of the heating-cooling system controlled by the operation mode controller.

FIG. 8 shows a flow chart of the heating-cooling system controlled by the operation mode of FIG. 6.

Functions of the thermostats shown in FIGS. 6 and 7 will be now described in connection with the flow chart. In this case, operation modes I, II and III in FIG. 6 correspond to, e.g., cooling, shutdown and heating operation state, respectively.

Temperature $T_{13}$ for deciding the initial operation mode is determined by the means for temperature preset to determine the initial operation mode 13 in FIG. 4. Temperature $T_{13}$ corresponds to the upper temperature control limit. Depending upon whether the sensed temperature T is above or below $T_{13}$, the initial operation mode is selected as I (cooling) or II (shutdown).

When the operation mode II is selected, the subsequent operation mode is governed by the function of the thermostat D in FIG. 7 after a certain time t has lapsed. When the lower temperature control limit $T_L$ is set at $T_{12}$ and the sensed temperature T is between the temperature control limits $T_{12}$ and $T_{13}$ of this operation mode ($T_{12} \leq T \leq T_{13}$), the operation mode II (i.e., state of operation shutdown) still continues; when the sensed temperature T exceeds the upper limit $T_{13}$ ($T_{13} < T$), the operation mode is changed to the mode I (i.e., state of cooling operation) in accordance with the operation mode change conditions; and when the sensed temperature T is lowered less than the lower limit $T_{12}$ ($T < T_{12}$), the operation mode is changed to the mode III (i.e., state of heating operation).

Next, in case the operation mode I is selected with the initial sensed temperature T meeting $T_{13} \leq T$, or in case the operation mode was changed from II to I as mentioned above, cooling operaion under the operation mode I is continued for a certain time t and then the subsequent operation mode is governed by the function of the thermostat C. During the operation mode I, the cooling control limit is determined at $T_{11}$ and the sensed temperature T is equal to or higher than the cooling control limit $T_{11}$ ($T_{11} \leq T$), cooling operation under the operation mode I still continues. When the sensed temperature T is lower than the cooling control limit $T_{11}$ ($T < T_{11}$), the operation mode is changed to the state of operation shutdown under the mode II in accordance with the operation mode change conditions.

Finally, in case the operation mode was changed from II to III, i.e., heating operation, the subsequent operation mode is governed by the thermostat E after a certain time t has lapsed. During operation mode III the heating control limit is set at $T_{14}$ and when the sensed temperature T is equal to or lower than the heating control limit $T_{14}$ ($T \leq T_{14}$), heating operation under the operation mode III still continues, while when the sensed temperature T exceeds the heating control limit $T_{14}$ ($T_{14} < T$), the operation mode is changed to the state of operation shutdown under the mode II in accordance with the operation mode change conditions.

As mentioned above, in the operation mode controller according to the present invention, each of the operation modes I, II and III continues for a certain time t after starting of operation. As a result, the respective temperature control limits ($T_{11}$ to $T_{14}$) for the corresponding operation modes (heating, shutdown and cooling) can be determined without the need of taking into account the difference $\Delta T_C$ between sensed temperature T and temperature $T_{11}$ at the beginning of cooling operation under the operation mode I as well as the difference $\Delta T_H$ between sensed temperature T and temperature $T_{14}$ at the beginning of heating operation under the operation mode III, unlike the prior art.

The range of temperature control limit $T_0$ in this operation mode controller is between the heating operation starting temperature $T_{12}$ and the cooling operation starting temperature $T_{13}$. This resulted from the reason that, because cooling operation under the operation mode I can not be changed directly to heating operation under the operation mode III or vice versa, the temperature control limits ($T_{11}$ to $T_{14}$) are not necessarily required to increase progressively (i.e., $T_1 < T_2 < T_3 < T_4$) as was always required in the prior art. As a consequence, the temperature control limit $T_0$ of the heating-cooling system in this embodiment can be largely narrowed to a range from $T_{12}$ to $T_{13}$ shown in FIGS. 6 and 7, as compared with the conventional range of temperature control limit from $T_1$ to $T_4$ shown in FIGS. 2 and 3, so that high-accuracy temperature control is achieved. The limits $T_{11}$, $T_{12}$, $T_{13}$ and $T_{14}$ of the present invention correspond to the limits $T_2$, $T_1$, $T_4$ and $T_3$ of FIGS. 2 and 3 respectively, in terms of being threshold temperatures they are not of corresponding values.

The sensed temperature T in the foregoing embodiment may be a representative value such as a resultant value of comparative calculation or an average value of plural sensed temperatures.

Further, although in the foregoing embodiment the initial operation mode was selected by comparing the temperature $T_{13}$ set by device for temperature setting to determine the initial operation mode 13 with the sensed temperature T, such an initial operation mode may be selected by comparison of the sensed temperature with any one of the temperature control limits $T_{11}$, $T_{12}$, $T_{13}$ or $T_{14}$.

Moreover, although the foregoing embodiment is directed to the case where the operation mode controller is applied to a heating-cooling system, it is also possible to utilize the operation mode controller in any system for controlling other status variables such as humidity, pressure, etc.

When the operation mode controller according to the present invention is used for controlling, e.g., the refrigerated state of refrigerators for marine transportation, the width of the temperature control limit of a thermostat is relatively small. This permits high-accuracy temperature control. Consequently, it is possible to improve the reliability of the operation mode controller.

What is claimed is:

1. An operation mode controller for controlling a system having at least three operation modes comprising:
    sensing means for determining a current value of a specific variable;
    means for presetting a desired value of said specific variable;
    means for presetting a plurality of sets of threshold values of said specific variable, each said set of threshold values associated with one of the operation modes and each set may contain an upper value limit and a lower limit value;
    selecting means for choosing a first one of said plurality of sets of threshold values to provide change condition information,
    memory means for storing change condition information in the controller,
    operation mode selector means for comparing the current value of the specific variable and threshold values of said first one of said plurality of sets of threshold values chosen by said selecting means; wherein a new one of said operation modes is selected only when the current value of the specific variable exceeds said upper value limit or falls below said lower value limit of said first one of said plurality of sets of threshold values, said new operation mode being selected in accordance with said change condition information in said memory means;
    means for producing a command for an operation mode in response to the operation of said operation mode selector means, a first operation mode being changed to said new operation mode when said new one of said operation modes is selected by said operation mode selector means, the first operation mode being unchanged when said operation mode selector does not select said new one of said operation modes, said command being sent to a control peripheral of the system and to said selecting means;
    counter means for sending a signal to said selecting means at a predetermined time t after the means for producing a command produces a command for the operation mode;
    said selecting means further selecting a set of threshold values from said means for presetting a plurality of sets of threshold values that corresponds to the operation mode that corresponds to said command after receiving said signal from said counter means; and
    means for setting an initial operation mode wherein said current value of said specific variable is compared to a preset initial value.

2. The operation mode controller of claim 1, wherein the three operation modes are the operation modes of a complex thermostat which is composed of two thermostats.

3. The operation mode controller of claim 2, wherein operation mode I corresponds to a cooling operation at a temperature range higher than $T_{11}$, operation mode II corresponds to a shut down operation at a temperature range between $T_{12}$ and $T_{13}$, and operation mode III corresponds to a heating operation at a temperature range lower than $T_{14}$.

4. The operation mode controller of claim 2, wherein said specific variable is the temperature in a refrigerator.

5. The operation mode controller of claim 1, wherein said specific variable is the temperature in a refrigerator.

6. The operation mode controller of claim 2, wherein said change operation conditions include;
    (a) when the state of the specific variable is less than a threshold value $T_{11}$ of a first set of threshold values in a mode I, a new set of threshold values is selected by said selecting means, said new set including new threshold values $T_{12}$, $T_{13}$, and the operation mode changes to a mode II,
    (b) when the state of the specific variable is less than the threshold value $T_{12}$ in mode II, a third set of threshold values is selected by said selecting means, said third set including a new threshold value $T_{14}$, and the operation mode changed to a mode III,
    (c) when the state of the specific variable is higher than the threshold value $T_{13}$, in mode II, the first set of threshold values is selected by said selecting means, said first set including threshold value $T_{11}$, and the operation mode changes to mode I,
    (d) when the state of the specific variable is higher than the threshold value $T_{14}$ in mode III, the second set of threshold values is selected by said selecting means said second set including threshold values $aT_{12}$, $T_{13}$, and the operation mode changes to mode II; and
    where $T_{11} < T_{12} < T_{13} < T_{14}$.

7. The operation mode controller according to claim 6, wherein change conditions set and stored in said memory means are as follow:
(i) operation mode I is allowed to assume operation mode I or II only as next mode but not allowed to change to operation mode III;
(ii) operation mode II is allowed to assume any one of all operation modes I, II and III as next mode; and
(iii) operation mode III is allowed to assume operation mode II or III only as next mode but not allowed to change to operation mode I.

8. An operation mode controller according to claim 1, wherein said counter means is a timer.

* * * * *